United States Patent
Rouphael et al.

(10) Patent No.: US 6,917,642 B1
(45) Date of Patent: Jul. 12, 2005

(54) METHOD FOR USING A NON-ORTHOGONAL PILOT SIGNAL WITH DATA CHANNEL INTERFERENCE CANCELLATION

(75) Inventors: Antoine J. Rouphael, Escundido, CA (US); John E. Hoffmann, Indialantic, FL (US); George Rodney Nelson, Jr., Merrit Island, FL (US); James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 794 days.

(21) Appl. No.: 09/772,200

(22) Filed: Jan. 29, 2001

Related U.S. Application Data
(60) Provisional application No. 60/184,365, filed on Feb. 23, 2000.

(51) Int. Cl.[7] .............................................. H04B 1/707
(52) U.S. Cl. ....................................................... 375/140
(58) Field of Search ................................. 375/130, 140, 375/146–148

(56) References Cited

U.S. PATENT DOCUMENTS
5,764,687 A * 6/1998 Easton ........................ 375/147
6,067,292 A * 5/2000 Huang et al. ................ 370/342

OTHER PUBLICATIONS
Proakis, John G., "Digital Communications," (McGraw-Hill Third Edition), Chapter 15, pp. 840–878 (1995).
Yang, Samuel C., "CDMA RF System Engineering," (Artech House) pp. 98–118, 149–156, and 253–257 (1998).

* cited by examiner

*Primary Examiner*—Kevin Burd
(74) *Attorney, Agent, or Firm*—Hamilton, Brook, Smith & Reynolds, P.C.

(57) ABSTRACT

A system and method for encoding/decoding data channels in a CDMA system having data channel interference cancellation, wherein data channel interference cancellation is used to remove unwanted non-orthogonal pilot signal components which are present within a demodulated data signal. This is accomplished by regenerating interference terms with respect to the non-orthogonal pilot signal and subtracting them from the demodulated data signal.

26 Claims, 9 Drawing Sheets

METHOD FOR USING A NON-ORTHOGONAL PILOT SIGNAL WITH DATA CHANNEL INTERFERENCE CANCELLATION

CROSS REFERENCE TO RELATED APPLICATIONS

This application claims priority from U.S. Provisional Application Ser. No. 60/184,365, filed Feb. 23, 2000, and entitled "METHOD FOR USING A NON-ORTHOGONAL PILOT SIGNAL WITH DATA CHANNEL INTERFERENCE CANCELLATION".

BACKGROUND OF THE INVENTION

1. Field of the Invention

The present invention generally relates to the field of data communications and processing and, more particularly, to a method for encoding/decoding data channels in a CDMA system having data channel interference cancellation.

2. Description of the Related Art

Code Division Multiple Access (CDMA) modulation is a multi-user access transmission scheme in which different users of the same transmission medium overlap both in frequency and in time. This is in contrast to Frequency Division Multiple Access (FDMA) in which users overlap in time, but are assigned unique frequencies, and Time Division Multiple Access (TDMA) in which users overlap in frequency, but are assigned unique timeslots. According to CDMA, each user is assigned a unique code sequence that allows the user to spread its information over the entire channel bandwidth, as opposed to particular sub-channel(s) in FDMA. Thus, signals from all users are transmitted over the entire channel. To separate out the signals for a particular user at a receiver, cross correlation is performed on the received signal using the same unique user code sequence.

CDMA transmission is well known to those of skill in the art. A comparison between CDMA and FDMA/TDMA may be found in Proakis, "Digital Communications", Chapter 15, which is incorporated herein by reference. Also, an example of a combined approach for minimizing inter-user interference (i.e., combining a Walsh basis within a group and a spreading sequence across groups) is the IS-95 system described in TIA/EIA/IS-95 "Mobile Station Compatibility Standard for Dual Mode Wideband Spread Spectrum Cellular System", which is incorporated herein by reference.

An IS-95 CDMA system is unique in that its forward and reverse links (i.e., the base station to mobile station and mobile station to base station) have different link structures. This is necessary to accommodate the requirements of a land-mobile communication system. The forward link consists of four types of logical channels, i.e., pilot, sync, paging, and traffic channels, with one pilot channel, one sync channel, up to seven paging channels, and several traffic channels. Each of these forward-linked channels is first spread orthogonally by its Walsh function, and then spread by a pair of short PN sequences (so-called pseudonoise) each of which is a sequence of high data rate bits ("Chips") ranging from −1 to +1 (polar) or 0 to 1 (non-polar). Subsequently, all channels in the system are added together to form the composite spread spectrum signal which is transmitted on the forward link.

The reverse link in the IS-95 CDMA system consists of two types of logical channels, i.e., access and traffic channels. Each of these reverse-link channels is spread orthogonally by a unique long PN sequence; hence each channel is recovered or decoded using the distinct long PN code. In some instances, a pilot channel is not used on the reverse link based on the impracticality of each mobile station broadcasting its own pilot sequence. Additionally, the IS-95 CDMA system uses 64 Walsh functions which are orthogonal to each other (i.e., their cross-product is equal to zero), and each of the logic channels on the forward link is identified by its assigned Walsh function. The Walsh function is used to generate a code which is used to separate individual users occupying the same RF band to avoid mutual interference on the forward link. The access channel is used by the mobile station to communicate with the base station when a traffic channel is not assigned to the mobile station. The mobile station uses the access channel to generate call originations and respond to pages and orders. The baseband data rate of the access channel is fixed at 4.8 kilobits per second (Kbps).

The pilot channel is identified by the Walsh function 0 ($\omega_0$). This channel contains no baseband sequence information. The baseband sequence is a stream of 0s which are spread by Walsh function 0, which is also a sequence of all zeros. The resulting sequence (still all 0s) is then spread or multiplied by a pair of quadrature PN sequences. Therefore, the pilot channel is effectively the PN sequence itself. The PN sequence with a specified offset uniquely identifies the particular geographical area or sector from which the user is transmitting the pilot signal. In an IS-95 CDMA system, both Walsh function 0 and the PN sequence operate at a rate of 1.2288 mega chips per second (Mcps). After PN spreading, baseband filters are used to shape the resultant digital pulses. These filters effectively lowpass filter the digital pulse stream and control the baseband spectrum of the signal. As a result, the signal band possesses a sharper roll-off near the band edge. The pilot channel is transmitted continuously by the base station sector. The pilot channel provides the mobile station with timing and phase reference. The measurement of the signal-to-noise ratio of the pilot channel by the mobile station also provides an indication of the strongest serving sector of that mobile. Here, the signal-to noise is the energy per chip per interference density, or $E_c/I_0$, where $E_c$, is the energy per chip and $I_0$ is the interference density.

Unlike the pilot channel, the sync channel carries baseband information. The baseband information is contained in the sync channel message which notifies the mobile of information concerning system synchronization and parameters. Similar to the sync channel, the paging channel also carries baseband information. However, unlike the sync channel, the paging channel transmits at a higher rate, i.e., at either 4.8 or 9.6 Kbps.

The forward and reverse traffic channels are used to transmit user data and voice; signaling messages are also sent over the traffic channel. The structure of the forward traffic channel is similar to that of the paging channel, while the structure of the reverse traffic channel is similar to that of the access channel. The only difference is that the forward traffic channel contains multiplexed power control bits (PCBs) and the reverse traffic channel contains a data burst randomizer which is used to generate a masking pattern of 0s and 1s to randomly mask redundant data.

The techniques for separating signals in time (i.e., TDMA), or in frequency (i.e., FDMA) are relatively simple ways of ensuring that the signals are orthogonal and non-interfereing. However, in CDMA, different users occupy the same bandwidth at the same, but are separated from each other via the use of a set of orthogonal waveforms, sequences, or codes. Two real-valued waveforms x and y are said to be orthogonal if their cross correlation $R_{xy}$ over time period T is zero, where $$R_{xy}(0) = \int_0^T x(t)y(t)\,dt \quad \text{(Eq. 1)}$$

In discrete time, the two sequences x and y are orthogonal if their cross-product $R_{xy}(0)$ is zero. The cross product is defined as $$R_{xy}(0) = x^T y^T = \sum_{i=1}^{I} x_i y_i \quad \text{(Eq. 2)}$$

where $x^T = [X_1\, X_2\, \ldots\, X_I]$ $y^T = [y_1\, y_2\, \ldots\, y_I]$

In this case, T denotes the vector transpose, i.e., a column represented as a row or vice versa. For example, the following two sequences or codes, x and y are orthogonal:

$x^T = [-1\, -1\, 1\, 1]$ $y^T = [-1\, 1\, 1\, -1]$ because their cross-correlation is zero; that is $$R_{xy}(0) = x^T y^T = (-1)(-1)+(-1)(1)+(1)(1)+(1)(-1) \quad \text{(Eq. 3)}$$

In order for the set of codes to be used in a multiple access scheme, additional properties are required. That is, in addition to the zero cross-correlation property, each code in the set of orthogonal codes must have an equal number of 1s and −1s. This property provides each particular code with the required pseudorandom characteristic. An additional property is that the dot product of each code scaled by the order of the code must equal to 1. The order of the code is effectively the length of the code, and the dot product is defined as a scalar obtained by multiplying the sequence by itself and summing the individual terms. This is given by the following relationship:

$$R_{xx}(0) = x^T x = \sum_{i=1}^{I} x_i x_i \quad \text{(Eq. 4)}$$

The increasing use of wireless telephones and personal computers has led to a corresponding demand for such advanced telecommunications techniques as CDMA, FDMA and TDMA, which were once thought to be only meant for use in specialized applications. In the 1980's wireless voice communication became widely available through the cellular telephone network. Such services were at first typically considered to be the exclusive province of the businessman because of high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless manner as well. This is of particular concern to the users of portable computers, laptop computers, hand-held personal digital assistants and the like who prefer to access such networks without being tethered to a telephone line.

However, there is still no widely available satisfactory solution for providing low cost, broad geographical coverage, high speed access to the Internet, private intranets, and other networks using the existing wireless infrastructure. This situation is a result of several factors. For one, the typical manner of providing high speed data service in the business environment over the wireline network is not readily adaptable to the voice grade service which is available in most homes or offices. Additionally, such standard high speed data services do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 Kbps to up to 9.6 Kbps for so-called Rate Set 1, and for increments from 1.8 Kbps up to 14.4 Kbps for Rate Set 2.

Existing systems therefore typically provide a radio channel which can accommodate maximum data rates only in the range of 14.4 Kbps at best in the forward direction. Such a low rate data channel does not directly lend itself to transmitting data at rates of 28.8 or even 56.6 Kbps which are now commonly available with conventional modem type equipment. Data rates at these levels are rapidly becoming the minimum acceptable rates for activities such as Internet access. Other types of data networks using higher speed building blocks such as Digital Subscriber Line (xDSL) service are just now coming into use. However, the cost of xDSL service has only recently been reduced to the point where it is attractive to the residential customer. Although xDSL and Integrate Services Digital Network (ISDN) networks were known at the time that cellular systems were originally deployed, for the most part, there is no provision for providing higher speed ISDN or xDSL grade data services over cellular networks. Unfortunately, in wireless environments, access to channels by multiple subscribers is expensive and there is competition for them. Whether the multiple access is provided by the traditional FDMA using analog modulation on a group of radio carriers, or by the newer digital modulation schemes which permit sharing of a radio carrier using TDMA or CDMA, the nature of the radio spectrum is that it is a medium which is expected to be shared. This is quite different from the traditional environment for data transmission, in which the wireline medium is relatively inexpensive to obtain, and is therefore not typically intended to be shared. Accordingly, it is apparent that there is a need to provide a system which supports higher speed ISDN or xDSL grade data services over cellular network topologies. In particular, what is needed is an efficient scheme for supporting wireless data communication such as from portable computers to computer networks such as the Internet and private intranets using widely available infrastructure.

Most modern wireless standards in widespread use such as CDMA do not provide an adequate structure with which to support the most common activities, such as web page browsing. In the forward and reverse link direction, the maximum available channel bandwidth in an IS-95 type CDMA system is only 14.4 Kbps. Due to IS-95 being circuit-switched, there are only a maximum of 64 circuit-switched users that can be active at one time. In practicality, this limit is difficult to attain, and 20 or 30 simultaneous users are typically active at one time. Furthermore, existing CDMA systems require certain operations before a channel can be used. For example, both access and traffic channels are modulated by so-called long code pseudonoise (PN) sequences. In addition, in order for the receiver to work properly it must first be synchronized with the transmitter. The setting up and tearing down of user channels therefore requires overhead to perform such synchronization. This overhead results in a reduction of the system data rate which produces a noticeable delay to a user of a subscriber unit. Moreover, in the presence of benign cell conditions, the data rate of a conventional CDMA system may become limited by the number of available orthogonal code channels.

SUMMARY OF THE INVENTION

The present invention is directed to a method for encoding/decoding data channels in a system having data channel interference cancellation. In accordance with the invention, the data rate of a system for a given user is increased by using a non-orthogonal pilot signal for channelization. As a result, one or more orthogonal channels become available for user traffic, rather than for use by the pilot channel. This leads to a reduction in the number of occupied orthogonal channels and an increase in system capacity available for each user due to the attainment of higher data rates which permit faster data delivery to system subscribers.

The use of a non-orthogonal pilot signal requires interference cancellation to remove the modulation effects of the pilot signal upon the data signal. This is accomplished by regenerating interference terms with respect to the non-orthogonal pilot signal and subtracting them from the demodulated data signal.

BRIEF DESCRIPTION OF THE DRAWINGS

The present invention may be more readily understood by one skilled in the art with reference being had to the following detailed description of the preferred embodiments thereof, taken in conjunction with the accompanying drawings wherein like elements are designated by identical reference numerals throughout the several views, and in which.

DESCRIPTION OF THE PREFERRED EMBODIMENTS

Figure 1:
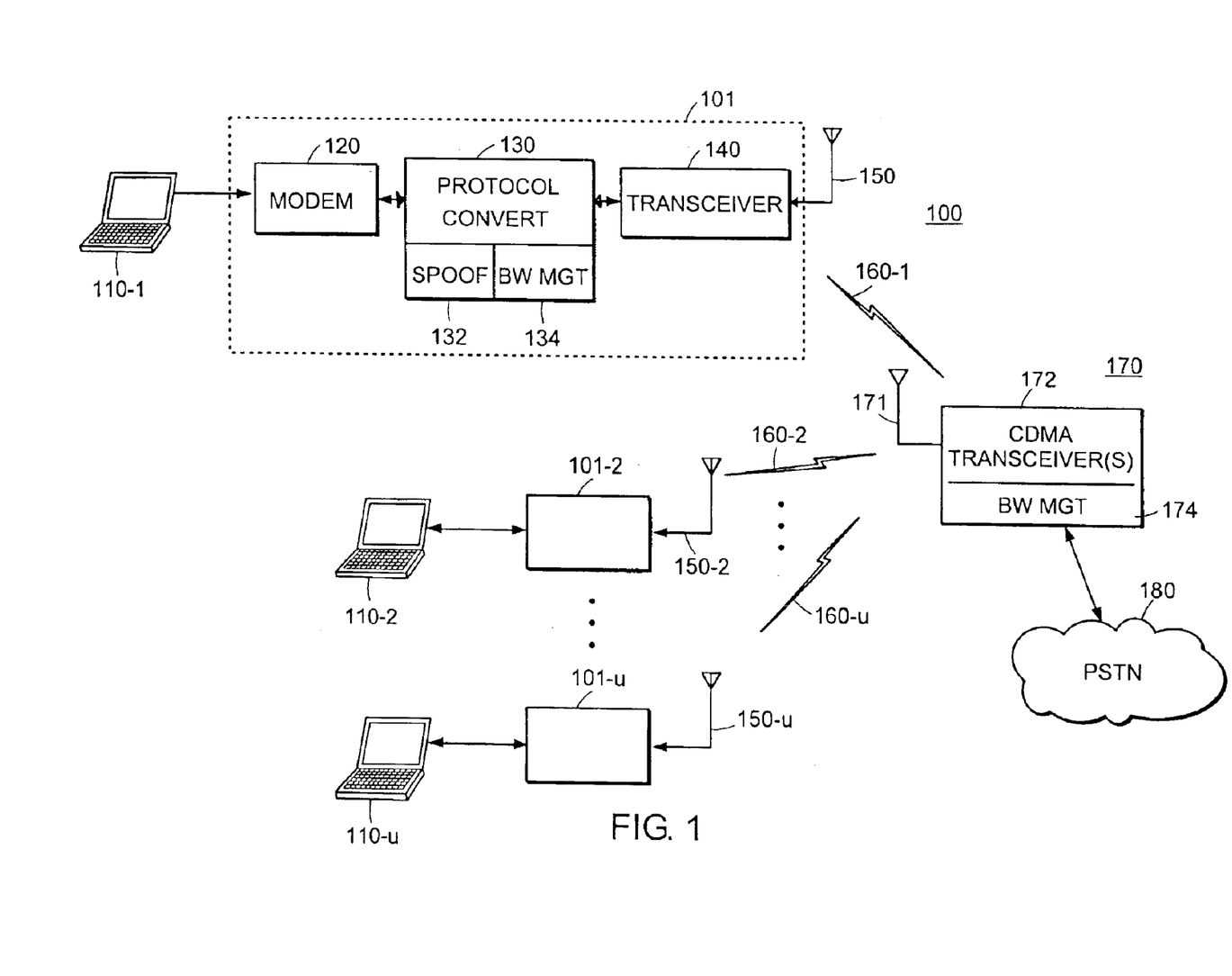
FIG. 1 is a block diagram of a wireless communication system which uses interference cancellation on the pilot channel in accordance with the invention.

FIG. 1 is a block diagram of a wireless communication system 100 which uses data channel interference cancellation to remove unwanted non-orthogonal pilot signal components present within the data signal. This results in a reduction in the number of occupied orthogonal channels and an increase in system capacity. This yields an increase in the system data rate which results in a reduction of the delay experienced by the user of the subscriber unit. As a result, high speed data and voice service over a wireless connection is achieved.

The system 100 includes two different types of components, such as subscriber units 101-1, 101-2, ..., 101-u (collectively, the subscriber unit 101) and one or more base stations 170. The subscriber units 101 and base stations 170 cooperate to provide the functions necessary to provide wireless data services to a portable computing device 110 such as a laptop computer, portable computer, personal digital assistance (PDA) or the like associated with a subscriber unit 101. The base station 170 also cooperates with the subscriber units 101 to permit the ultimate transmission of data to and from the subscriber unit 101 and the public switch telephone network (PSTN) 180. More particularly, data and/or voice services are also provided by the subscriber unit 101 to the portable computer 110 as well as one or more devices such as telephones. The telephones themselves may in turn be connected to other modems and computers which are not shown in FIG. 1.

The subscriber unit 101 itself may include a modem, such as an ISDN modem 120, a device referred to herein as a protocol converter 130 which performs various functions including spooling 132 and bandwidth management 134, CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the necessary additional functions may be provided entirely by the protocol converter 130 which may be sold as a separate device. Alternatively, the ISDN modem 120, protocol converter 130 and CDMA transceiver 140 may be integrated as a complete unit and sold as a single subscriber unit device 101. Other types of interface connections such as Ethernet or PCMCIA may be used to connect the computing device to the protocol converter 130. The device may also interface to an Ethernet interface rather than an ISDN "U" interface.

The ISDN modem 120 converts data and voice signals between the format used by the terminal equipment 110 and the format required by the standard ISDN "U" interface. The U interface is a reference point in ISDN systems that designates a point of the connection between the network termination (NT) and the telephone company.

The protocol converter 130 performs spooling 132 and basic bandwidth management 134 functions. In general, spooling 132 consists of insuring that the subscriber unit 101 communicates with the terminal equipment 110 which is connected to the public switched telephone network 180 on the other side of the base station 170 at all times. The bandwidth management function 134 is responsible for allocating and deallocating CDMA radio channels 160 as required. Bandwidth management 134 also includes the dynamic management of the bandwidth allocated to a given session by dynamically assigning sub-portions of the CDMA radio channels 160. The CDMA transceiver 140 accepts the data from the protocol converter 130 and reformats the data into the appropriate form for transmission through the subscriber unit antenna 150 over CDMA radio link 160-1. The CDMA transceiver 140 may operate over only a single 1.25 MHz radio frequency channel, or may be tunable over multiple allocatable radio frequency channels.

CDMA signal transmissions from the subscriber units 101 are received and processed by the base station equipment 170. The base station equipment 170 typically includes multichannel antennas 171, multiple CDMA transceivers 172 and a bandwidth management function 174. Bandwidth management 174 controls the allocation of CDMA radio channels 160 and subchannels, in a manner analogous to the subscriber unit 101. Transceiver 172 demodulates the received CDMA signals, and the base station 170 couples the demodulated radio signals to the PSTN 180 in a manner which is well known in the art. For example, the base station 170 may communicate with the PSTN 180 over any number of different efficient communication protocols such as primary rate ISDN, or other LAPD based protocol such as IS-634 or V5.2.

It should also be understood that data signals travel bidirectionally across the CDMA radio channels 160. In other words, data signals received from the PSTN 180 are coupled to the portable computer 110 in a forward link direction, and data signals originating at the portable computer 110 are coupled to the PSTN 180 in a reverse link direction.

Each of the CDMA transceivers such as transceiver 140 in the subscriber unit 101, and transceivers 172 in the base station 170, are capable of being tuned at any given point in time to a given 1.25 Megahertz radio frequency channel. It is generally understood that such 1.25 MHz radio frequency carrier provides, at best, a total equivalent of about 500, 600 kbps maximum data rate transmission within acceptable bit error rate limitations.

Figure 2:
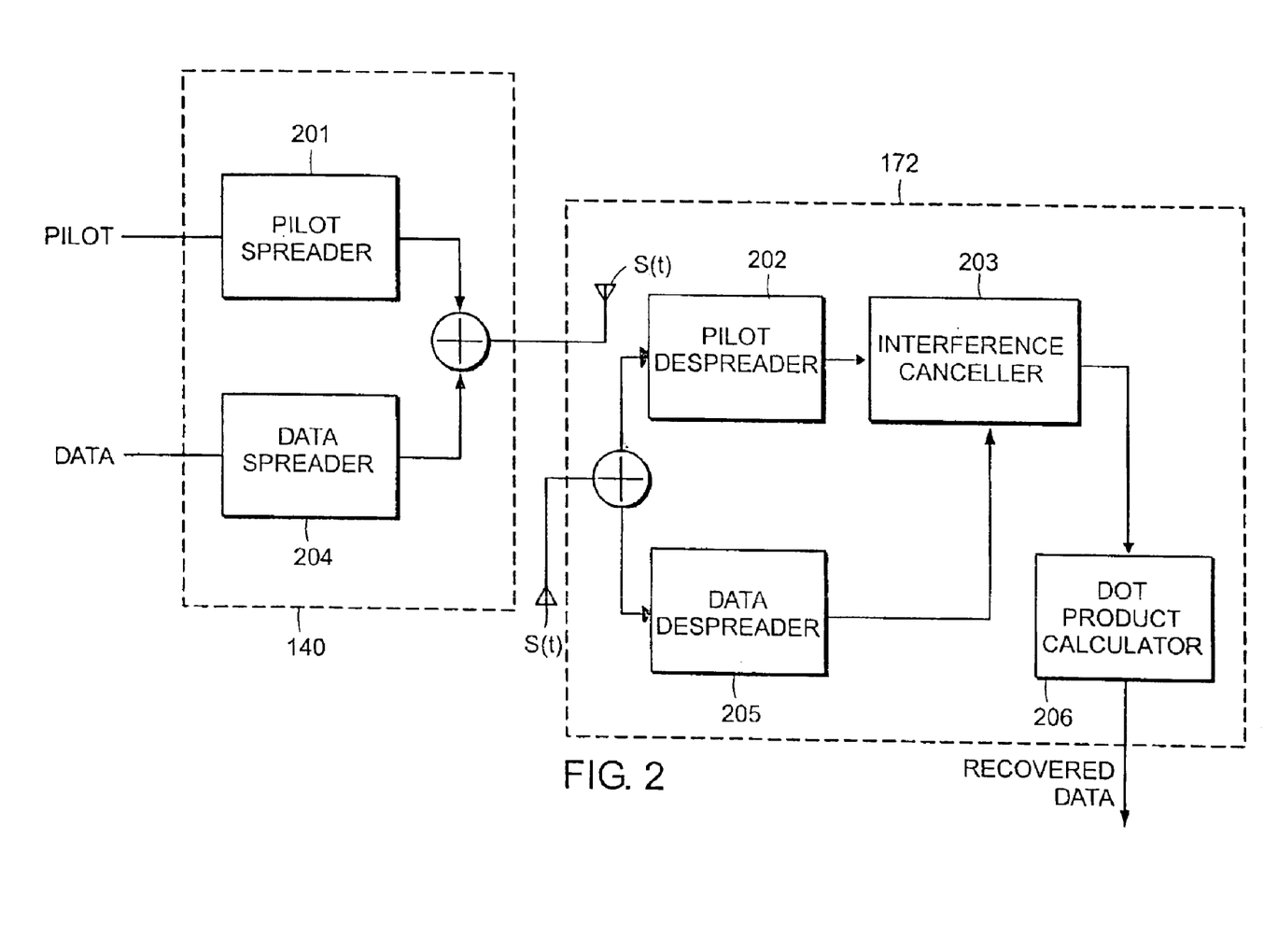
FIG. 2 is a schematic block diagram of a CDMA transceiver for implementing the method in accordance with the present invention.

FIG. 2 is a schematic block diagram of CDMA transceivers 140, 172 of the wireless communication system 100 for implementing the method according to the present invention. Specifically, FIG. 2 is a block diagram of a transmitter portion of a transceiver 140 and a receiver portion of transceiver 172. Initially, pilot spreader 201 is used to modulate a non-orthogonal pilot signal such that the pilot signal is spread over an entire channel bandwidth. Concurrently, data spreader 204 is used to spread data over the same channel bandwidth. The spread pilot and data signals are then combined to form a composite signal S(t) which is transmitted to base station 170 for despreading by pilot despreader 202 and data despreader 205, respectively. The despreaders 202, 205 are used to recover the non-orthogonal pilot signal and the data signal, respectively, from the transmitted composite signal S(t). The outputs of the pilot despreader 202 and data despreader 205 are fed to an interference canceller 203 which is used to remove interference introduced into the data signal by the non-orthogonal pilot signal. Once the interference from the non-orthogonal pilot signal is removed by the interference canceller 203, the original data is recovered via dot product calculator 206 and output for later processing by a communications system (not shown).

Figure 3:
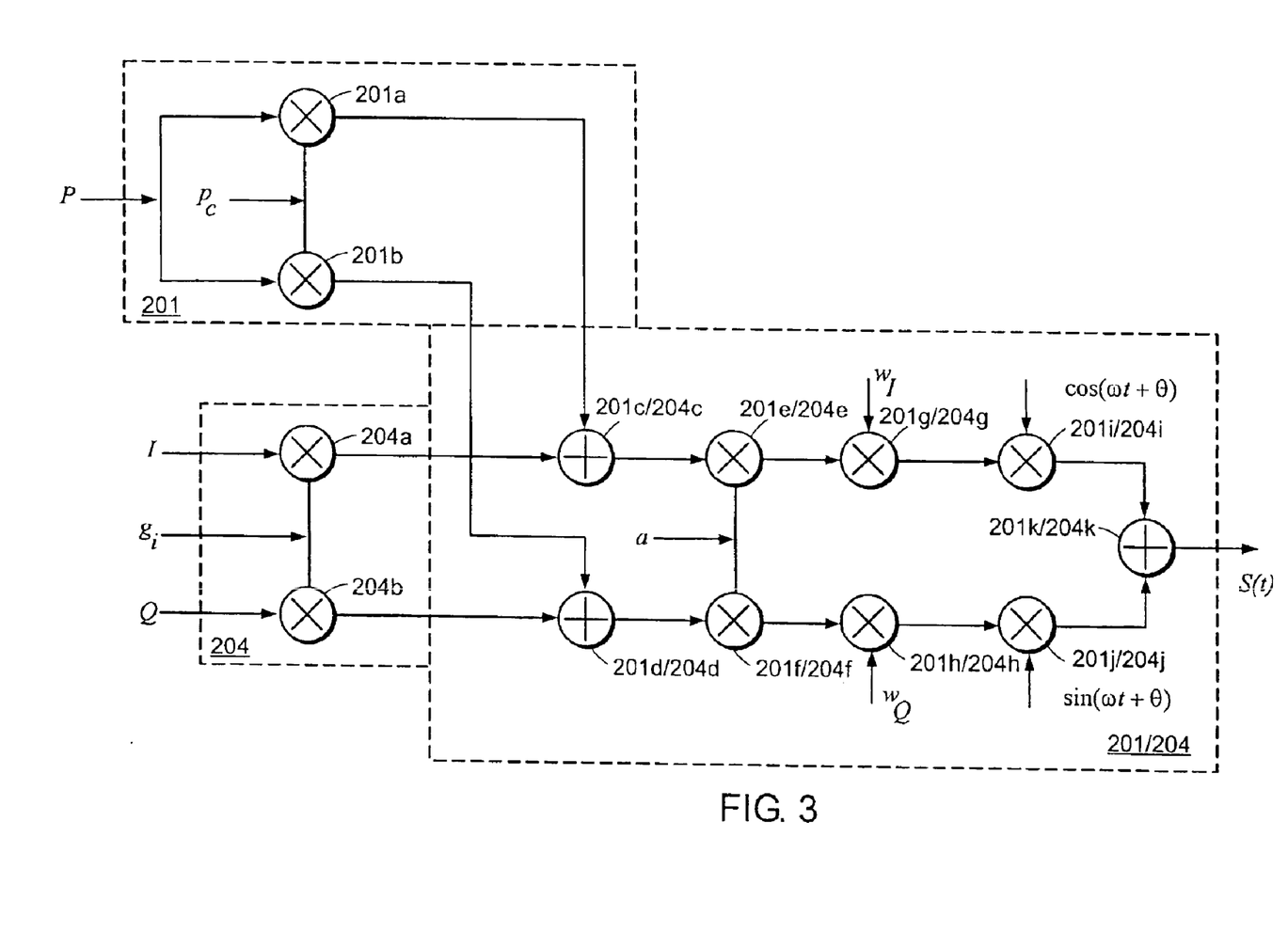
FIG. 3 is an illustration of a pilot/data spreader of FIG. 2.

FIG. 3 is a block diagram of a pilot/data spreader 201 and 204 of FIG. 2 which are used to modulate the non-orthogonal pilot and data signals such that they are spread over an entire channel bandwidth. At nodes 201a and 201b of the pilot spreader 201, a non-orthogonal pilot signal P is modulated by a channel code $p_c$ which is used to uniquely identify the transmitted pilot signal P. At nodes 204a and 204b of the data spreader 204, a data signal which is split into sub-band data I and Q is mixed with a signal $g_i$ which represents a specific channel code of a user (I and Q represent the in-phase and quadrature portions of the 5 data signal, respectively). At node 201c/204c, the output signal from node 201a is summed with the output signal from node 204a to produce a resultant signal. Simultaneously, at node 201d/204d, the output signal from node 204b is summed with the output signal from node 201b to produce a resultant signal.

At nodes 201e/204e and 201f/204f, the resultant signals are each modulated by a PN code a. Next, in order to provide baseband or phase discrimination between the I and Q sub-band portions of the data signal, the output signals of nodes 201e/204e and 201f/204f are modulated (i.e., spread) by channel separation signals $w_I$ and $w_Q$, respectively, at nodes 201g/204g and 201h/204h, respectively. In this case, the channel separation signals $w_I$, and $w_Q$ belong to a family of orthogonal functions such as those disclosed in U.S. Pat. No. 4,460,992 to Gutleber, which is incorporated herein by reference as if set forth expressly. Each respective channel separation signal spreads the in-phase portion and quadrature portion of the data signal to produce composite signals. At the nodes 201i/204i and 201j/204j, the respective composite output signals from nodes 201g/204g and 201h/204h are subsequently modulated by respective cosine and sine functions (i.e., cos(wt+θ) and sin(wt+θ)). The output signals from nodes 201i/204i and 204j/201j are then summed to form a composite signal S(t) given by the following relationship:

$$S(t)=Pap_cw_I \cos(\omega t+\theta)+Pap_cw_Q\sin(\omega t+\theta)+I_naw_Ig_i \cos(\omega t+\theta)+Q_naw_Qg_i\sin(\omega t+\theta) \quad \text{(Eq. 5)}$$

The signal given by the relationship in equation 5 is transmitted to base station 170 which contains a data despreader 205 (see FIG. 6) for use in the demodulation of the transmitted composite signal S(t) to recover the original data signal.

Figure 4:
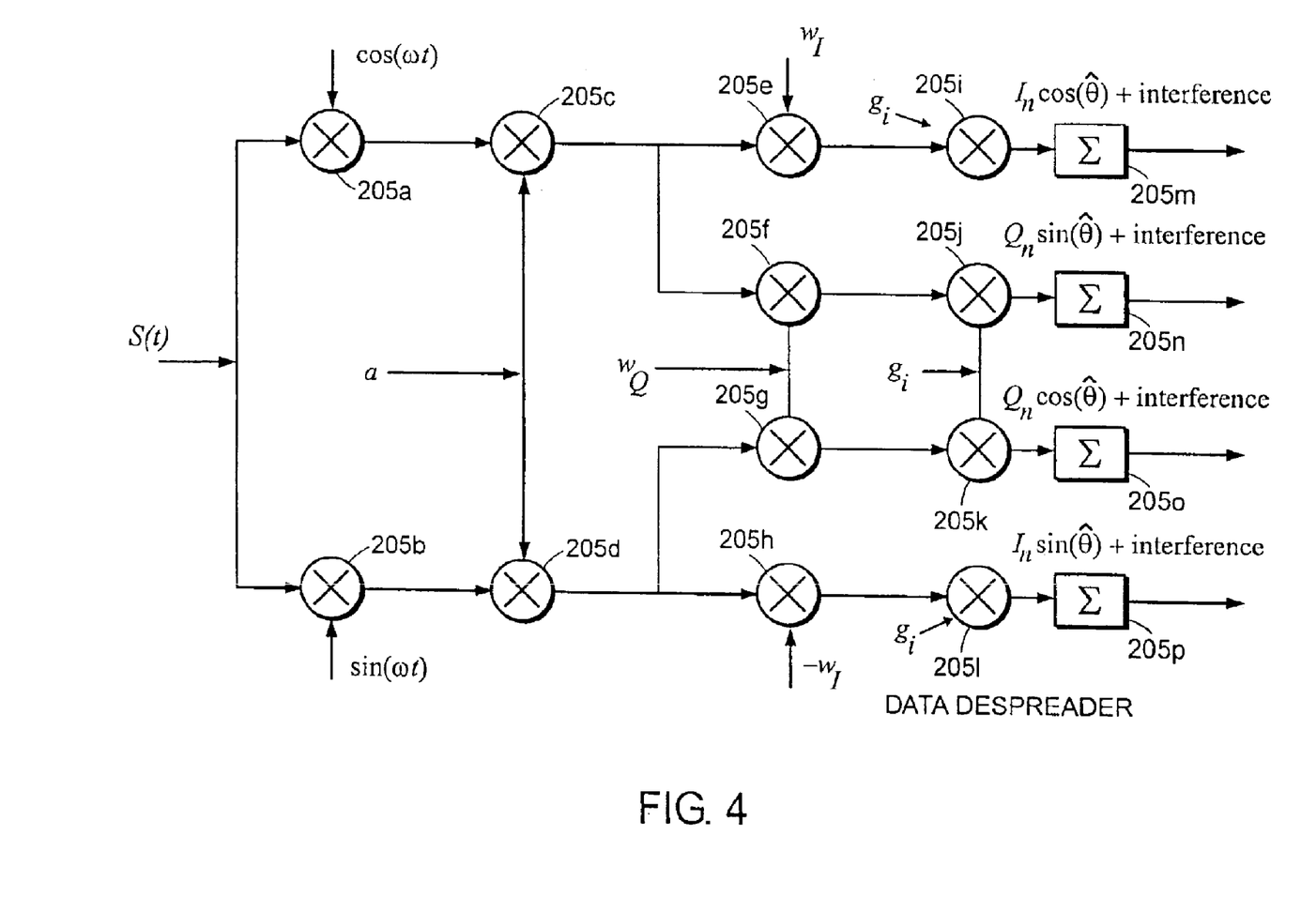
FIG. 4 is an illustration of a data despreader of FIG. 2.

FIG. 4 is a schematic block diagram of a data despreader 205 which is used in the recovery of the originally transmitted data signal. In the data despreader 205 shown in FIG. 4, the signal S(t) given in equation 5 is initially decoded by demodulating S(t) by cos(wt) and sin(wt) at nodes 205a and 205b, respectively to produce resultant output signals. Next, at nodes 205c and 205d, the resultant output signals from nodes 205a and 205b are demodulated by the PN code a. The output signals of nodes 205c and 205d are each demodulated by the channel separation function $w_Q$ at nodes 205f and 205g, respectively. Concurrently, the output signal of node 205c is demodulated by the channel separation function $w_I$ at node 205e, while at node 205h the output signal of node 205d is demodulated by a channel separation function $-w_I$, which is a complex conjugate of the channel separation function $w_I$. The output signals of nodes 205e, 205f, 205g and 205h are respectively demodulated at nodes 205i, 205j, 205k and 205l by the channel code of a user $g_i$.

Given two codes A and B of length n, an integration and dump function occurs when the lengths of the codes are matched, multiplied together, integrated and the result output for further processing. In this manner, an integration and dump function is then performed at nodes 205m–205p, respectively, upon the output signals of nodes 205i–205l to obtain the following relationships:

$$\sum_N (P_I(t) + S_I(t))aw_Q g_i = \qquad \text{(Eq. 6)}$$

$$\frac{N}{2}Q_n\sin(\theta) + \frac{1}{2}\sum_N Pg_i p_c\sin(\theta) + \frac{1}{2}\sum_N Pg_i p_c w_I w_Q\cos(\theta)$$

-continued $$\sum_N (P_I(t) + S_I(t))aw_I g_i = \tag{Eq. 7}$$

$$\frac{N}{2} I_n \cos(\theta) + \frac{1}{2}\sum_N Pg_i p_c \cos(\theta) + \frac{1}{2}\sum_N Pg_i p_c w_I w_Q \sin(\theta)$$

$$\sum_N (P_Q(t) + S_Q(t))a(-w_i)g_i = \tag{Eq. 8}$$

$$\frac{N}{2} I_n \sin(\theta) + \frac{1}{2}\sum_N Pg_i p_c \sin(\theta) - \frac{1}{2}\sum_N Pg_i p_c w_I w_Q \cos(\theta)$$

$$\sum_N (P_Q(t) + S_Q(t))aw_Q g_i = \tag{Eq. 9}$$

$$\frac{N}{2} Q_n \cos(\theta) + \frac{1}{2}\sum_N Pg_i p_c \cos(\theta) - \frac{1}{2}\sum_N Pg_i p_c w_I w_Q \sin(\theta)$$

where each summation term in equations 6–9 represents interference due to the pilot signal which must be removed to accurately reconstruct the originally transmitted data signal, and each N in the summation is the processing gain.

Figure 5:
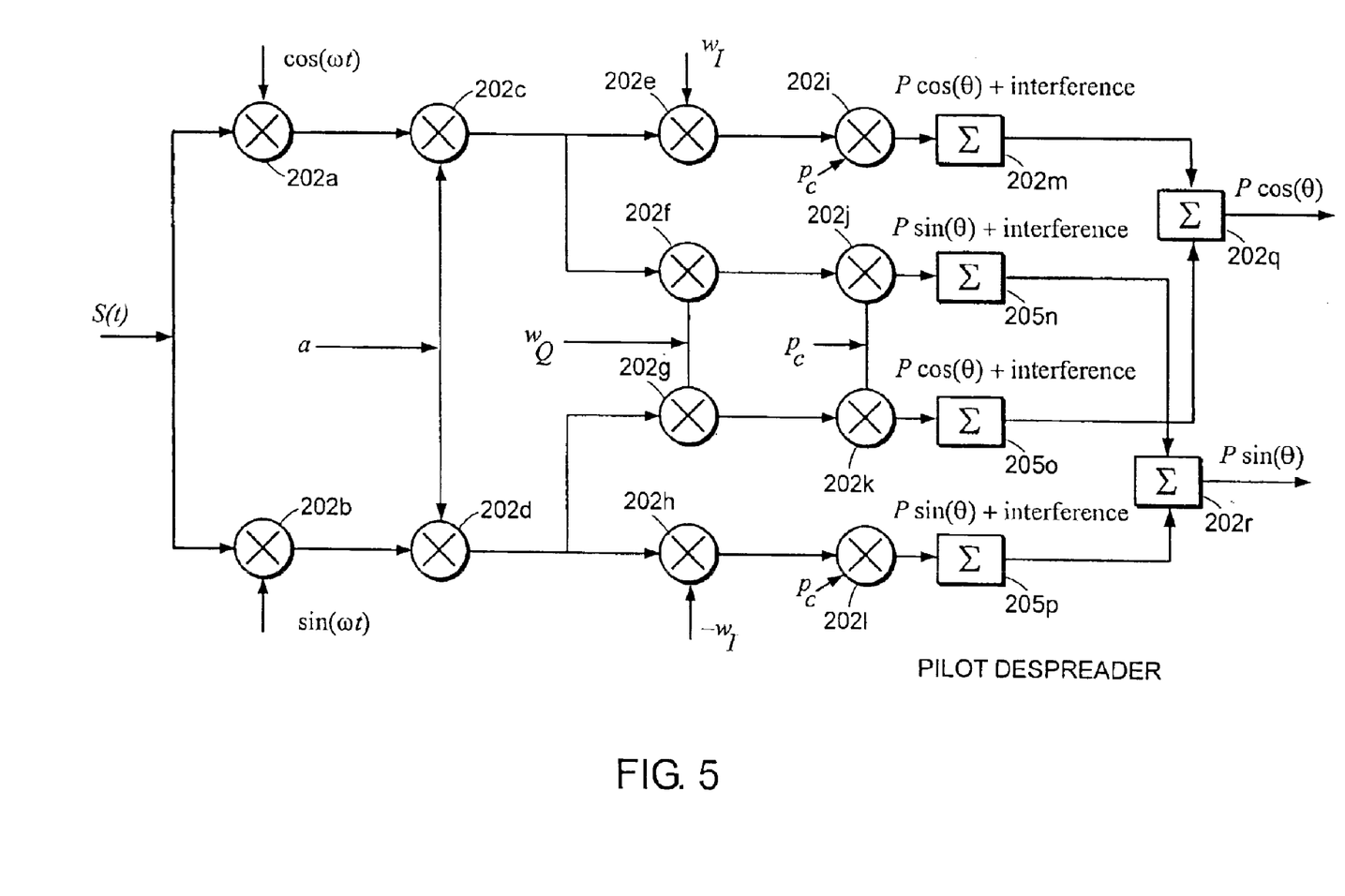
FIG. 5 is an illustration of a pilot despreader of FIG. 2.

FIG. 5 is an illustration of the pilot despreader 202 which is used to recover the originally transmitted pilot signal P. To accomplish this, the transmitted composite signal S(t), given by the relationship in equation 14, is demodulated by cosine and sine functions (i.e., cos(ωt) and sin(ωt)) at nodes 202a and 202b. Next, the output signals from nodes 202a and 202b are demodulated by the PN code a at nodes 202c and 202d, respectively. The output signals from nodes 202c and 202d are each demodulated by the channel separation function $W_Q$ at nodes 202f and 202g, respectively. Concurrently, the output signal of node 205c is demodulated by the channel separation function $w_I$ at node 202e, while at node 202h the output signal of node 202d is demodulated by the channel separation function $-w_I$. The output signals of nodes 202e, 202f, 202g and 202h are respectively demodulated at nodes 202i, 202j, 202k and 202l by the channel code $p_c$ which is used to uniquely identify the transmitted pilot signal P. After demodulating the output signals of nodes 202i–202l, the integration and dump function is performed to obtain the output signals given by the following relationships at nodes 205m, 205n, 205o and 205p, respectively:

$$\sum_N (P_I(t) + S_I(t))aw_I p_c = \tag{Eq. 10}$$

$$\frac{N}{2} P\cos(\theta) + \frac{1}{2}\sum_N I_n g_i p_c \cos(\theta) + \frac{1}{2}\sum_N Q_n g_i p_c w_I w_Q \sin(\theta)$$

$$\sum_N (P_I(t) + S_I(t))aw_Q p_c = \tag{Eq. 11}$$

$$\frac{N}{2} P\sin(\theta) + \frac{1}{2}\sum_N Q_n g_i p_c \sin(\theta) + \frac{1}{2}\sum_N I_n g_i p_c w_I w_Q \cos(\theta)$$

$$\sum_N (P_Q(t) + S_Q(t))a(-w_i)p_c = \tag{Eq. 12}$$

$$\frac{N}{2} P\sin(\theta) + \frac{1}{2}\sum_N I_n g_i p_c \sin(\theta) - \frac{1}{2}\sum_N Q_n g_i p_c w_I w_Q \cos(\theta)$$

$$\sum_N (P_Q(t) + S_Q(t))aw_Q p_c = \tag{Eq. 13}$$

$$\frac{N}{2} P\cos(\theta) + \frac{1}{2}\sum_N Q_n g_i p_c \cos(\theta) - \frac{1}{2}\sum_N I_n g_i p_c w_I w_Q \sin(\theta)$$

where N is the processing gain.

As shown in FIG. 5, four output signals are generated which each contain interference as a result of the demodulation process. Equations 10–13 represent the output signal at nodes 202m, 202n, 202o and 202p, respectively. In this case, the eight summation terms in equations 10–13 represent the interference added to the pilot signal as a result of the demodulation process. At node 202q, the output signals from nodes 202m and 202o are subsequently subjected to an additional integration and dump function, while the integration and dump function is performed on the output signals from nodes 202n and 202p at node 202r. As a result, the signals are filtered such that the interference is removed and the originally transmitted pilot signal P is recovered.

Figure 6:
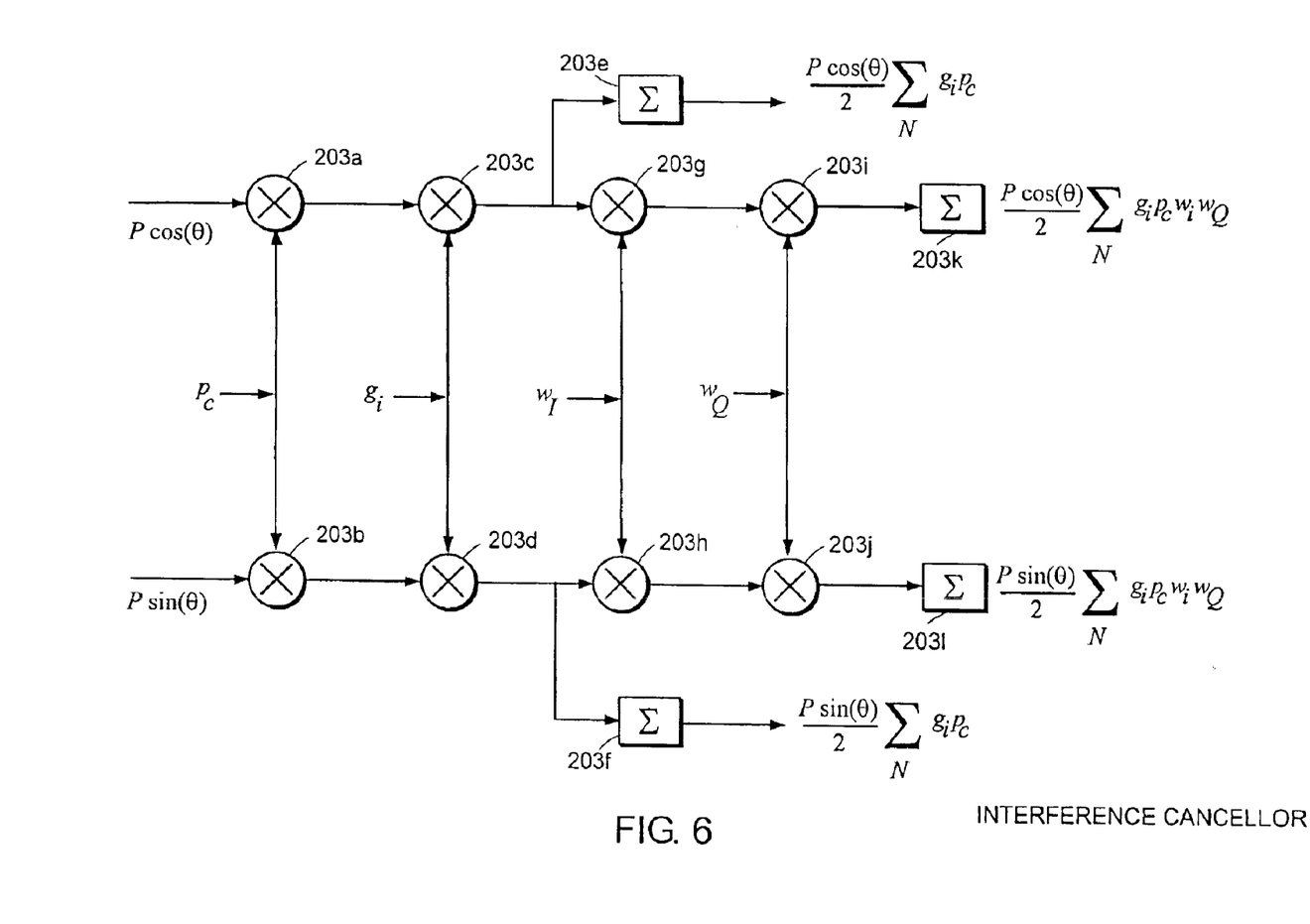
FIG. 6 is an illustration of an interference canceller of FIG. 2.

Along with the output of the pilot despreader 202, the output of the data despreader 205 is provided to an interference canceller 203 shown in FIG. 6. The output of the pilot despreader is fed to the input of the interference canceller 203, and the output of the interference canceller 203 is subtracted from the output of the data despreader 205 in a manner which is known to yield I and Q sub-band data signals which do not contain interference associated with the pilot signal P.

The interference canceller 203 shown in FIG. 6 is used to remove the interference associated with the pilot signal P which is introduced into the data signal during the demodulation process. The interference added to the data signal is represented by the summation terms in the relationships given in equations 6–9. To remove the interference from the despread data signals, the Pcos(θ) and Psin(θ) inputs of the interference canceller 203 are each modulated by the channel code $p_c$ at nodes 203a and 203b, respectively. Next, the output signals of nodes 203a and 203b are each modulated by the group user channel code $g_i$. At this point, an integration of the output signals of nodes 203c and 203d is performed to yield respective first and second interference terms given by the following relationships:

$$\frac{P\cos(\theta)}{2}\sum_N g_i p_c \text{ and} \tag{Eq. 14}$$

$$\frac{P\sin(\theta)}{2}\sum_N g_i p_c \tag{Eq. 15}$$

where N is the processing gain.

Next, the output signals from nodes 203c and 203d are modulated by the $w_I$ channel separation function at nodes 203g and 203h, respectively. The output signals from nodes 203g and 203h are then modulated by the channel separation function $w_Q$ at nodes 203i and 203j, respectively. An integration of the output signals from nodes 203i and 203j is performed at nodes 203k and 203l to yield respective third and forth interference terms given by the following relationships:

$$\frac{P\cos(\theta)}{2}\sum_N g_i p_c w_I w_Q \text{ and} \tag{Eq. 16}$$

$$\frac{P\sin(\theta)}{2}\sum_N g_i p_c w_I w_Q \tag{Eq. 17}$$

where N is the processing gain.

The relationships expressed in equations 14–17 are subtracted from the respective expressions found in equations 6–9 to remove the interference from the I and Q sub-band data signals. At this point, once the interference is removed from the data signal, complete recovery of the data signal is possible.

Figure 7:
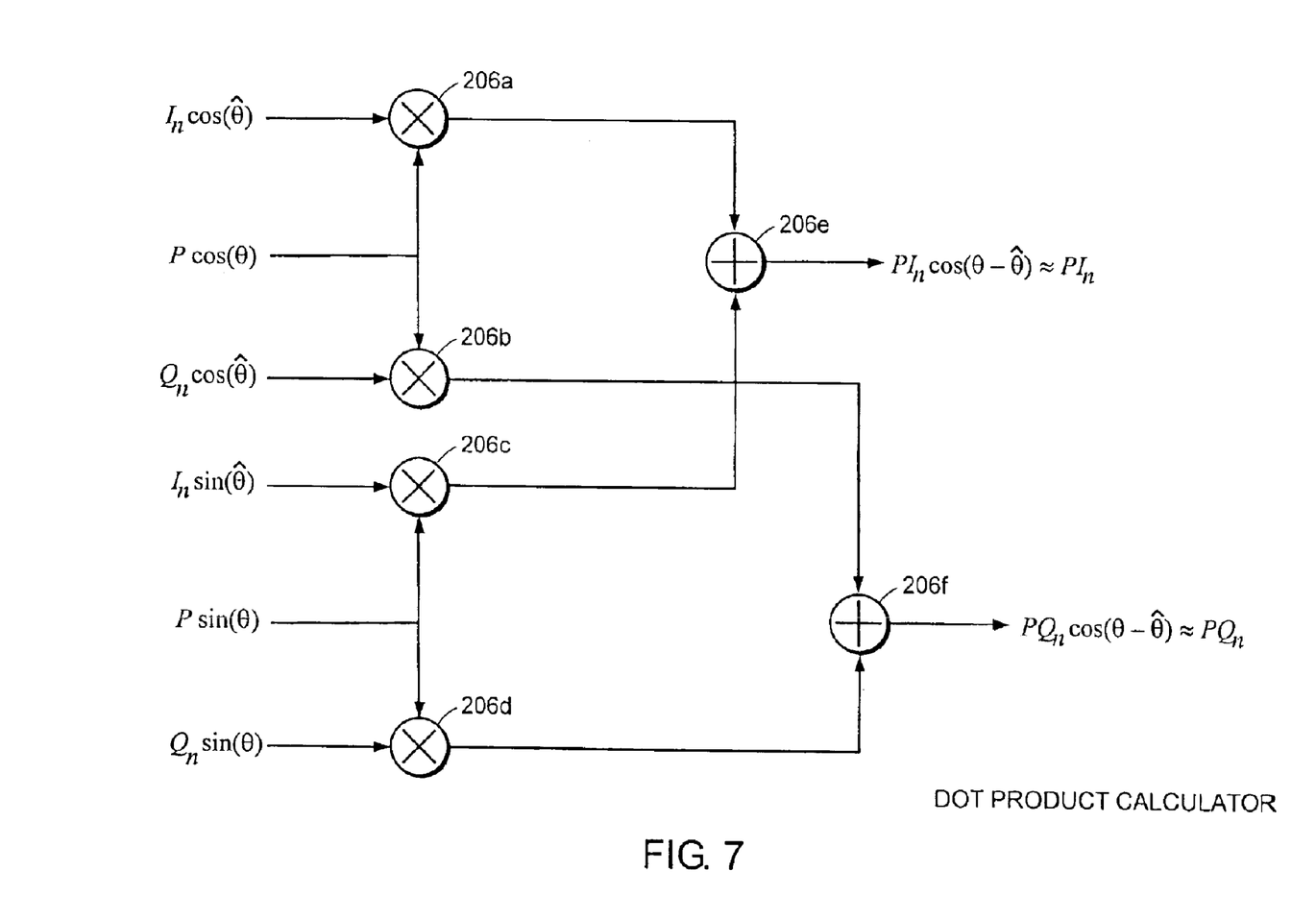
FIG. 7 is an illustration of a dot product calculator of FIG. 2.

FIG. 7 is an illustration of an exemplary dot product calculator 206 for performing a dot product calculation to recover the original data signal. After removal of the interference terms given in equations 14–17, each respective portion of the $I_n$ and $Q_n$ sub-band data signals is forwarded to the dot product calculator 206. The respective cosine and sine portions of the pilot signal P which are output from the pilot despreader 202 are also forwarded to the dot product calculator 206, as shown in FIG. 7. At nodes 206a and 206b, the cosine portion of the pilot signal P is modulated by the cosine portions of the $I_n$, and $Q_n$, sub-band data signals. Simultaneously, at nodes 206c and 206d, the sine portion of the pilot signal P is modulated by the sine portions of the $I_n$, and $Q_n$, sub-band data signals. At node 206e, the output signal of nodes 206a and 206c are summed together to yield an output signal given by the following relationship:

$$PI_n \cos(\theta-\hat{\theta}) \approx PI_n \qquad (Eq.18)$$

At node 206f, the output signals of nodes 206b and 206d are summed together to yield another output signal given by the following relationship:

$$PQ_n \cos(\theta-\hat{\theta}) \approx PQ_n \qquad (Eq. 19)$$

where the ^ term in equations 18 and 19 indicates a coarse estimate of the phase over one symbol (i.e., the number of chips per signal). At this point, one skilled in the art will readily appreciate that equations 18 and 19 represent the originally transmitted I and Q sub-band data signals, where each sub-band is multiplied by the pilot signal P.

Figure 8A:
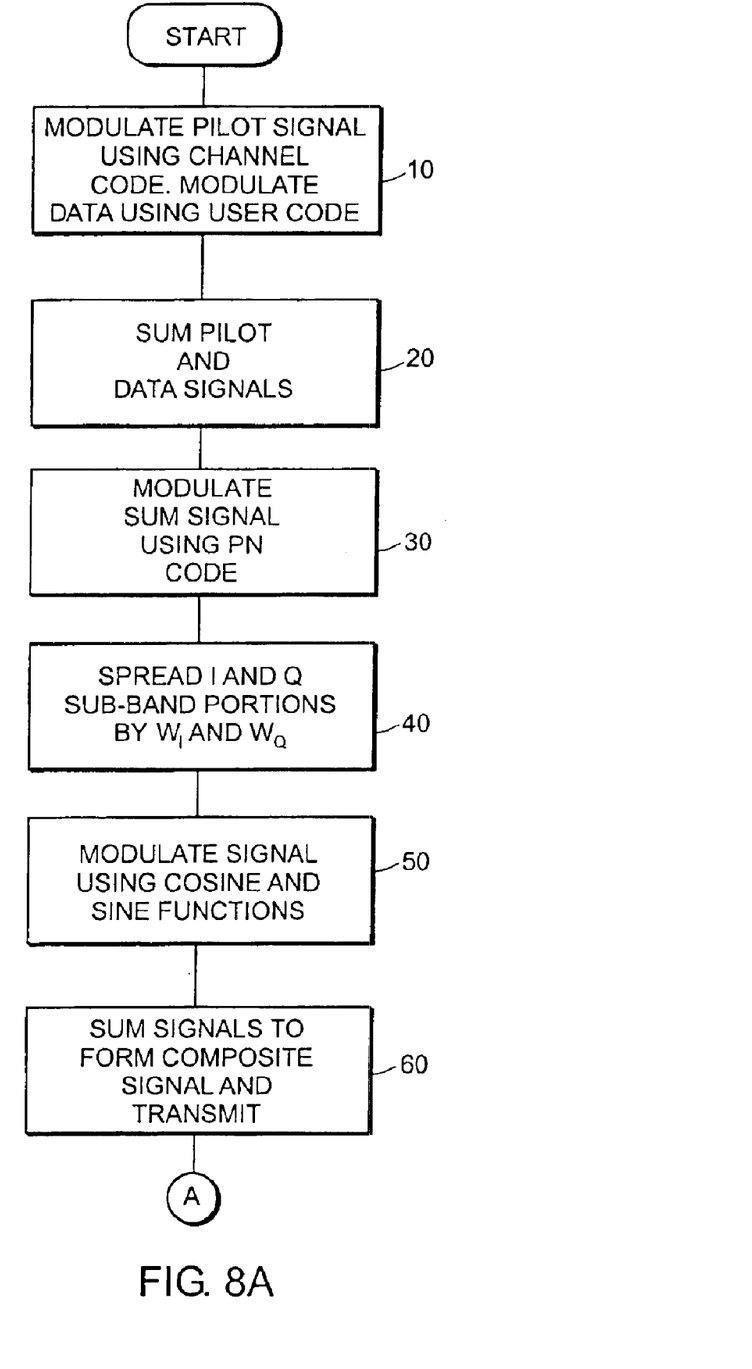
FIGS. 8A and 8B are flow charts illustrating the steps of the method according to the invention.
Figure 8B:
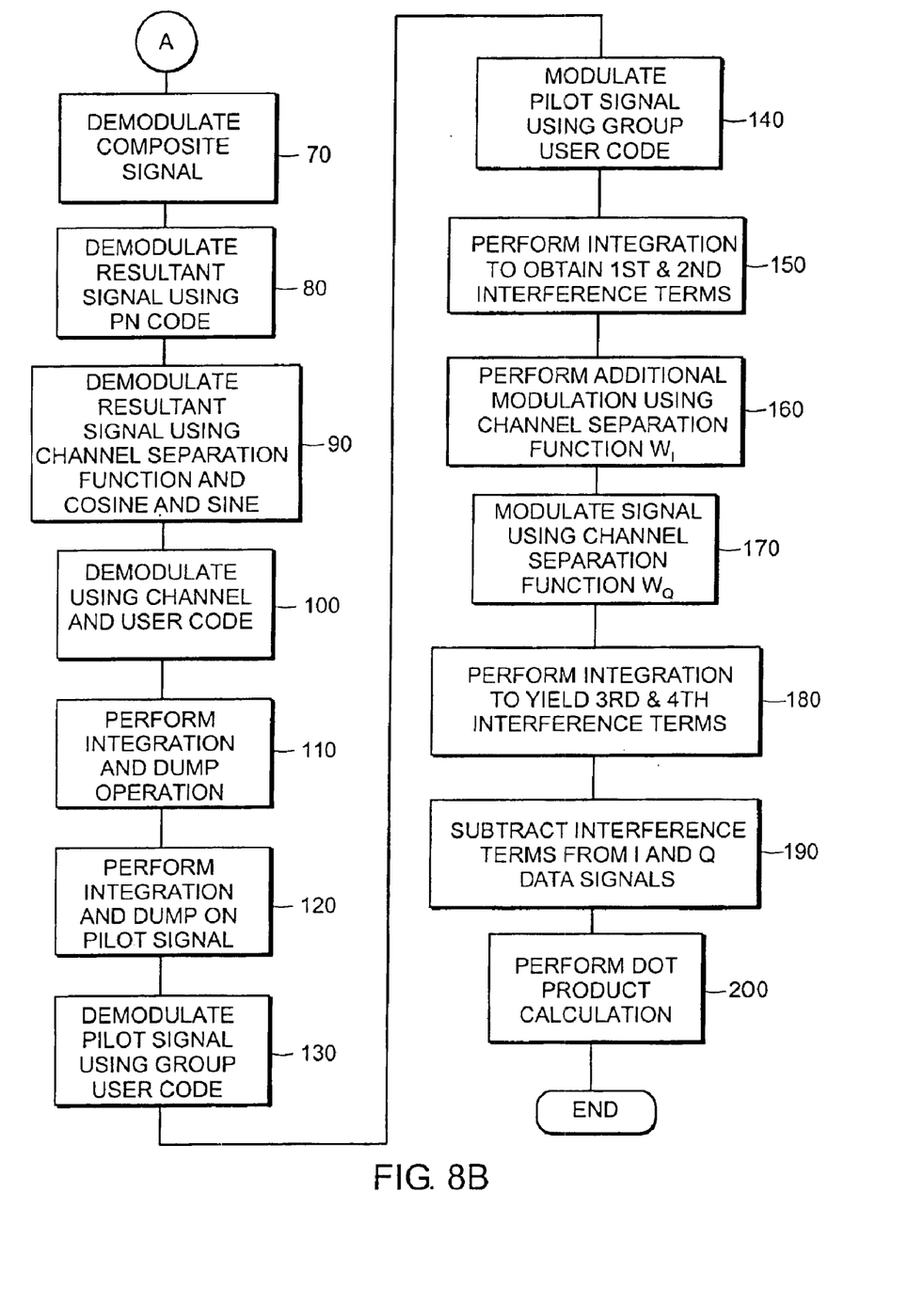

FIGS. 8A and 8B are flow charts of the method for using a non-orthogonal pilot signal according to the invention. In step 10, a non-orthogonal pilot signal P is modulated by a channel code $p_c$. Simultaneously, a data signal which is split into sub-band data I and Q is mixed with a specific channel code of a user $g_i$. In step 20, the non-orthogonal pilot signal is then summer with the I and Q sub-band data signals to produce resultant signals.

In step 30, the resultant signals are then modulated by a PN code a. In step 40, to provide baseband or phase discrimination between the I and Q sub-band portions of the data signal, the resultant output signals are modulated (i.e., spread) by channel separation signals $w_I$ and $w_q$. In step 50, the respective composite output signals are modulated by respective cosine and sine functions (i.e., cos(wt+θ) and sin(wt+θ)). In step 60, the cosine and sine output signals are then summed to form the composite signal S(t) which is transmitted to the base station 170.

In step 70, the composite signal S(t) is initially decoded by demodulating it with cos(wt) and sin(wt). Next in step 80, the resultant output signal is demodulated by the PN code a. In step 90, the resultant signal is demodulated by the channel separation function $w_Q$. Concurrently, the resultant signal with respect to cos(wt) is demodulated by the channel separation function $w_I$, while the resultant signal with respect to sin(wt) is demodulated by a channel separation function $-w_I$. In step 100, the signals which were demodulated by the channel separation function $w_Q$ are then demodulated by the channel code of a user $g_i$, and the channel code $p_c$.

In step 110, an integration and dump function is performed upon the resultant output signal to obtain the demodulated data signal containing the interference. Concurrently, an integration and dump function is also performed to obtain the demodulated non-orthogonal pilot signal. In step 120, the demodulated non-orthogonal pilot signal is subjected to an additional integration and dump function to remove interference from the originally transmitted non-orthogonal pilot signal P.

In step 130, the demodulated non-orthogonal pilot signal is modulated by the channel code $p_c$. In step 140, the modulated pilot signal is modulated by the group user channel code $g_i$. In step 150, an integration of the signal is performed to yield first and second interference terms. In step 160, the signal modulated by the user channel code $g_i$, is additionally modulated by the $w_I$ channel separation function. In step 170, the resultant signal is then modulated by the channel separation function $w_Q$. In step 180, an integration of the resultant signal is performed to yield third and forth interference terms. In step 190, the interference terms are subtracted from the demodulated data signal to remove the interference from the I and Q sub-band data. Finally, in step 200, a dot product calculation is performed to recover the originally transmitted I and Q sub-band data signals.

While the invention has been particularly shown and described with reference to a preferred embodiment thereof, it will be understood by those skilled in the art that various changes in form and details may be made therein without departing from the spirit and scope of the invention.

What is claimed is:

1. A method for encoding data channels in a CDMA system having data channel interference cancellation, comprising the steps of:

generating a non-orthogonal pilot signal by modulating a pilot signal using a pilot channel code that is non-orthogonal to codes used to modulate other channels;

mixing a data signal having an in-phase portion and a quadrature phase portion with a specific user channel code;

producing resultant signals by summing the non-orthogonal pilot signal and the mixed data signal;

modulating the resultant signals using a PN code;

baseband discriminating the in-phase and the quadrature phase portions of the data signal to produce second resultant signals;

modulating the discriminated in-phase portion and quadrature phase portion of the data signal;

forming a composite output signal; and transmitting the composite output signal to a base station.

2. The method of claim 1, wherein said mixing step comprises the step of:

modulating the data signal using the specific user channel code.

3. The method of claim 1, wherein said modulating the discriminated in-phase portion and quadrature phase portion of the data signal comprises the step of:

modulating the discriminated in-phase portion and the discriminated quadrature phase portion of the data signal using respective cosine and sine functions.

4. The method of claim 1, wherein said forming step comprises the step of:

summing the second resultant signals.

5. The method of claim 1, wherein said baseband discriminating step comprises the step of:

spreading the in-phase portion and the quadrature phase portion of the data signal.

6. The method of claim 5, wherein said spreading step comprises the step of:

modulating the in-phase portion and the quadrature phase portion of the data signal using channel separation signals.

7. The method of claim 6, wherein said separation signals are orthogonal functions.

8. An apparatus for encoding data channels in a CDMA system having data channel interference cancellation, comprising:
   means for generating a non-orthogonal pilot signal by modulating a pilot signal using a pilot channel code that is non-orthogonal to code used to modulate other channels;
   means for mixing a data signal having an in-phase portion and a quadrature phase portion with a specific user channel code;
   means for producing resultant signals by summing the non-orthogonal pilot signal and the mixed data signal;
   means for modulating the resultant signals using a PN code;
   means for baseband discriminating the in-phase portion and the quadrature phase portion of the data signal to produce a second resultant signal;
   means for modulating the discriminated in-phase portion and quadrature phase portion of the data signal; and
   means for forming a composite output signal.

9. A method for decoding data channels in a CDMA system having data channel interference cancellation, comprising the steps of:
   receiving a composite signal at a base station, the composite signal comprising an original data signal encoded with an original non-orthogonal pilot signal;
   decoding the composite signal to generate first resultant signals;
   demodulating the first resultant signals using a PN code to generate second resultant signals;
   demodulating the second resultant signal using channel separation functions to generate demodulated resultant signals;
   mixing the demodulated resultant signal with channel code data;
   filtering mixed demodulated resultant signals to generate demodulated data signals and a demodulated non-orthogonal pilot signal, the demodulated data signals including data signal interference, the data signal interference being introduced into the original data signal as a result of the original data signal being encoded with the original non-orthogonal pilot signal, the demodulated non-orthogonal pilot signal including pilot signal interference, the pilot signal interference being introduced into the original non-orthogonal pilot signal during demodulation;
   filtering the non-orthogonal pilot signal to remove the pilot signal interference from the demodulated non-orthogonal pilot signal in order to regenerate the original non-orthogonal pilot signal;
   generating data signal interference terms that represent the data signal interference in the demodulated data signals, the data signal interference terms being derived from the regenerated non-orthogonal pilot signal;
   subtracting the data signal interference terms from the demodulated data signals; and
   performing a dot product calculation using the filtered non-orthogonal pilot signal and in-phase sub-band portions and quadrature sub-band portions of the data signals to generate a decoded composite output signal.

10. The method of claim 9, wherein said decoding step comprises the step of:
   demodulating the composite signal using respective cosine and sine functions.

11. The method of claim 9, wherein said demodulating the second resultant signal step comprises the steps of:
   despreading the second resultant signal with respect to the in-phase sub-band portions and quadrature sub-band portions of the data signal using a first channel separation signal and a second channel separation signal, respectively; and
   despreading the second resultant signal with respect to the in-phase sub-band portions and the quadrature sub-band portions of the data signal using a third channel separation signal.

12. The method of claim 11, wherein the second channel separation signal is a complex conjugate of the first channel separation signal.

13. The method of claim 12, wherein the first channel separation signal and the second channel separation signal are orthogonal functions.

14. The method of claim 9, wherein said mixing step comprises the steps of:
   demodulating non-orthogonal pilot signal components of the demodulated resultant signals using the channel code data; and
   demodulating in-phase sub-band portions and quadrature sub-band portions of the demodulated data signal using a specific user channel code.

15. The method of claim 9, wherein said filtering step comprises the step of:
   performing an integration and dump.

16. The method of claim 9, wherein said step of generating the data signal interference terms comprises the steps of:
   modulating the demodulated non-orthogonal pilot signal, using the channel code data to generate resultant output signals; and
   modulating the resultant output signal using a specific channel code of a user to generate a first data signal interference term and a fourth data signal interference term.

17. The method of claim 16, further comprising the steps of:
   subsequent to modulating the resultant output signals using a specific channel code of a user, modulating the resultant output signals using a first channel separation signal and a second channel separation signal to generate a second data signal interference term and a third data signal interference term.

18. The method of claim 16, wherein the first channel separation signal and the second channel separation signal are orthogonal functions.

19. The method of claim 9, wherein said step of performing a dot product calculation comprises the steps of:
   modulating cosine portions of the in-phase sub-band portions and cosine portions of the quadrature sub-band portions of the data signal using a cosine portion of the demodulated non-orthogonal pilot signal to generate resultant cosine in-phase sub-band portions and resultant cosine quadrature sub-band portions;
   modulating sine portions of the in-phase sub-band portions and sine portions of the quadrature sub-band portions of the data signal using a sine portion of the demodulated non-orthogonal pilot signal to generate resultant sine in-phase sub-band portions and resultant sine quadrature sub-band portions;
   summing the resultant cosine in-phase sub-band portions and the resultant sine in-phase sub-band portions to generate a first composite signal portion;

summing the resultant cosine quadrature sub-band portions and the resultant sine quadrature sub-band portions to generate a second composite portion; and outputting the first composite signal portion and the second composite signal portion as the decoded composite output signal.

20. A method for decoding data channels in a CDMA system having data channel interference cancellation, comprising the steps of:

receiving a composite signal at a base station;

decoding the composite signal to generate first resultant signals;

demodulating the first resultant signals using a PN code to generate a second resultant signal;

demodulating the second resultant signal using channel separation functions to generate a demodulated resultant signal;

mixing the demodulated resultant signal with channel code data;

filtering mixed demodulated resultant signal to generate a demodulated data signal and a demodulated non-orthogonal pilot signal;

filtering the non-orthogonal pilot signal to remove interference;

generating pilot signal interference terms;

subtracting the pilot signal interference terms from the data signal; and performing a dot product calculation using the filtered non-orthogonal pilot signal and in-phase sub-band portions and quadrature sub-band portions of the data signal to generate a decoded composite output signal; and wherein said filtering includes performing an integration and dump, said integration and dump further comprises the steps of:

comparing code lengths of the demodulated data signals to each other;

multiplying matching code lengths of the demodulated data signals; and integrating multiplied and matched code lengths of the demodulated data signals.

21. An apparatus for decoding data channels in a CDMA system having data channel interference cancellation, comprising the steps of:

means for receiving a composite signal at a base station, the composite signal comprising an original data signal encoded with an original non-orthogonal pilot signal;

means for decoding the composite signal to generate first resultant signals;

means for demodulating the first resultant signals using a PN code to generate a second resultant signal;

means for demodulating the second resultant signal using channel separation functions to generate demodulated resultant signals;

means for mixing the demodulated resultant signal with channel code data;

means for filtering mixed demodulated resultant signals to generate demodulated data signals and a demodulated non-orthogonal pilot signal, the demodulated data signals including data signal interference, the data signal interference being introduced into the original data signal as a result of the original data signal being encoded with the original non-orthogonal pilot signal, the demodulated non-orthogonal pilot signal including pilot signal interference, the pilot signal interference being introduced into the original non-orthogonal pilot signal during demodulation;

means for filtering the non-orthogonal pilot signal to remove the pilot signal interference from the demodulated non-orthogonal pilot signal in order to regenerate the original non-orthogonal pilot signal;

means for generating data signal interference terms that represent the data signal interference in the demodulated data signals, the data signal interference terms being derived from the regenerated non-orthogonal pilot signal;

means for subtracting the data signal interference terms from the demodulated data signals; and means for performing a dot product calculation using the filtered non-orthogonal pilot signal and in-phase sub-band portions and quadrature sub-band portions of the data signals to generate a decoded composite output signal.

22. A method for encoding/decoding data channels in a CDMA system having data channel interference cancellation, comprising the steps of:

modulating a non-orthogonal pilot signal using a pilot channel code that is non-orthogonal to codes used to modulate other channels;

modulating a data signal using a specific user channel code;

summing the modulated data signal and the non-orthogonal pilot signal to obtain resultant signals;

modulating the resultant signals using a PN code;

spreading the modulated resultant signals using channel separation signals;

modulating the spread modulated resultant signals using respective cosine and sine functions;

summing the spread modulated signals to form a composite output signal;

transmitting the composite output signal to a base station;

receiving the transmitted composite output signal at a transceiver, the composite signal comprising the data signal encoded with the non-orthogonal pilot signal;

demodulating received composite signal using the respective cosine and sine functions to generate a demodulated composite signal;

demodulating the demodulated composite output signal using a PN code;

demodulating the demodulated composite output signal using channel separation functions to obtain demodulated resultant signals;

filtering the demodulated resultant signals to generate a demodulated data signal and a demodulated non-orthogonal pilot signal, the demodulated data signal including data signal interference, the data signal interference being introduced into the original data signal as a result of the data signal being encoded with the non-orthogonal pilot signal, the demodulated non-orthogonal pilot signal including pilot signal interference, the pilot signal interference being introduced into the non-orthogonal pilot signal during demodulation;

filtering the non-orthogonal pilot signal to remove the pilot signal interference from the demodulated non-orthogonal pilot signal in order to regenerate the non-orthogonal pilot signal;

generating first, second, third and fourth data signal interference terms that represent the data signal interference in the demodulated data signal, the data signal interference terms being derived from the regenerated non-orthogonal pilot signal;

subtracting the first, second, third and fourth data signal interference terms from the demodulated data signal; and performing a dot product calculation to generate an in-phase sub-band data signal and a quadrature sub-band data signal.

23. A method for encoding data channels, comprising:

providing a pilot signal and a data signal;

modulating the data signal onto a data channel;

modulating the pilot signal onto a pilot channel, the pilot channel being non-orthogonal to the data channel, resulting in a non-orthogonal pilot signal; and combining the non-orthogonal pilot signal and the modulated data signal into a composite output signal that is capable of transmission over a wireless medium.

24. A wireless transmitter for encoding data channels, comprising:

a data spreader that modulates a data signal onto a data channel;

a pilot spreader that modulates the pilot signal onto a pilot channel, the pilot channel being non-orthogonal to the data channel, resulting in a non-orthogonal pilot signal; and a summer that combines the non-orthogonal pilot signal and the modulated data signal into a composite output signal that is capable of transmission over a wireless medium.

25. A method for decoding data channels, comprising:

receiving a composite signal, the composite signal comprising an original data signal encoded with an original non-orthogonal pilot signal;

demodulating the composite signal into a demodulated data signal that includes data signal interference, the data signal interference being introduced into the original data signal as a result of the original data signal being encoded with the original non-orthogonal pilot signal;

demodulating the composite signal into a demodulated non-orthogonal pilot signal that includes pilot signal interference, the pilot signal interference being introduced into the original non-orthogonal pilot signal during demodulation;

removing the pilot signal interference from the demodulated non-orthogonal pilot signal in order to regenerate the original non-orthogonal pilot signal;

generating data signal interference terms that represent the data signal interference in the demodulated data signal, the data signal interference terms being derived from the regenerated non-orthogonal pilot signal; and removing the data signal interference terms from the demodulated data signal.

26. A wireless receiver for decoding data channels, comprising:

a wireless interface receiving a composite signal, the composite signal comprising an original data signal encoded with an original non-orthogonal pilot signal;

a data despreader demodulating the composite signal into a demodulated data signal that includes data signal interference, the data signal interference being introduced into the original data signal as a result of the original data signal being encoded with the original non-orthogonal pilot signal;

a pilot despreader demodulating the composite signal into a demodulated non-orthogonal pilot signal that includes pilot signal interference, the pilot signal interference being introduced into the original non-orthogonal pilot signal during demodulation;

the pilot despreader removing the pilot signal interference from the demodulated non-orthogonal pilot signal in order to regenerate the original non-orthogonal pilot signal;

an interference canceller generating data signal interference terms that represent the data signal interference in the demodulated data signal, the data signal interference terms being derived from the non-orthogonal pilot signal; and the interference canceller removing the data signal interference terms from the demodulated data signal.

* * * * *